Oct. 25, 1938.
J. M. SIMMONS
2,134,587
BRAKE FOR SLEDS AND JUMPERS
Filed Dec. 18, 1936
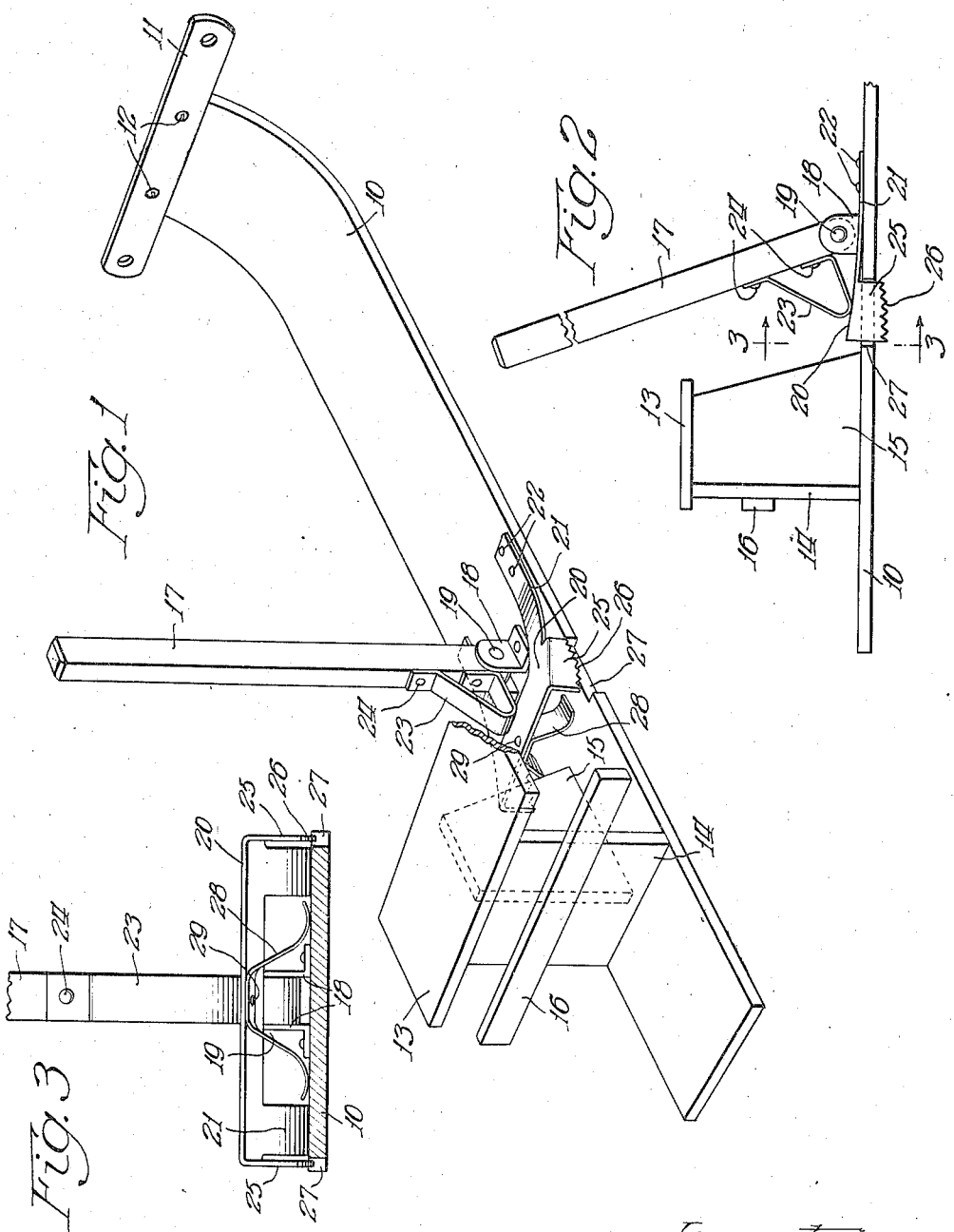
Witness
I. Siljander
Inventor
Joseph M. Simmons
By Hill and Hill
Attys Patented Oct. 25, 1938

2,134,587

UNITED STATES PATENT OFFICE 2,134,587

BRAKE FOR SLEDS AND JUMPERS

Joseph M. Simmons, Chicago, Ill.

Application December 18, 1936, Serial No. 116,503

9 Claims. (Cl. 188—8)

My invention relates to juvenile toys and more particularly it relates to jumpers or sleds adapted for coasting on snow, ice and the like.

An object of the invention is the provision of improvements in toy sleds comprising a single rigid, relatively wide runner and an improved brake device, operable by the rider not only to regulate speed but also as a steering device or guide to keep the sled in a straight course while moving over uneven surfaces and over surfaces of varying degrees of smoothness.

Another object of the invention is the provision of a jumper or sled in combination with brake and steering means therefor of the kind described which are strong, durable, inexpensive, easily assembled and satisfactory for their intended purpose.

Many other objects and advantages of the construction herein shown and described will be obvious to those skilled in the art from the description herein given.

To this end my invention consists in the novel construction, arrangement and combination of parts herein shown and described, and more particularly pointed out in the claims.

One embodiment of the invention is shown for illustrative purposes in the drawing in which:

Fig. 1 is a perspective view of the sled with one corner of the seat broken away to more clearly show the brake and brake actuating mechanism;

Fig. 2 is a side elevational view with the front end of the sled broken away; and Fig. 3 is a view along the line 3—3 of Fig. 2, drawn to a larger scale.

In the embodiment of the invention shown in the drawing, there is provided a single runner or baseboard 10 having its forward end curved upwardly. A transversely extending bar 11 is mounted on the curved end and projects beyond the edges of the board to provide a foot-rest or brace member. The bar 11 is fastened to the baseboard 10 by any suitable means such as a plurality of screws, bolts, rivets or the like 12.

A board 13 positioned at a suitable elevation above the baseboard 10 provides a seat for the rider. The seat board 13 is preferably spaced from the foot rest or bar 11 at a distance such that the rider's legs are slightly bent at the knees when sitting upright on the seat and pushing against the bar.

The baseboard 10 is preferably of such a length that it projects a short distance rearwardly of the seat board 13 as shown. The seat board 13 is rigidly connected with the baseboard 10 by a T-shaped seat support comprising a transverse member 14 and a central longitudinally extending member 15. The members 14 and 15 may be fastened together and to the seat 14 and baseboard 10 by nails, screws and the like, not shown, or they may also be framed together to provide a rigid connection between the seat and the baseboard. A transverse bar 16, nailed or otherwise fastened to the member 14 and of a length such that its ends project beyond the seat 13, provides a hand gripping device for use by the rider in case of emergency. For example, the hand gripping member 16 enables the rider to maintain his balance as the sled successively gallops or jumps down hill over bumps or barriers and may also be utilized to a certain extent to guide the sled by enabling the rider to lean to one side without falling, and thereby change directions as desired.

In shipping the same with the foot rest 11, the bar 16 and foot rest center the sled in the shipping carton.

The described construction of the seat support and its connection with the seat and the baseboard provides a durable structure adapted to withstand the strains incident to galloping and coasting rapidly down hill over bumps, both artificial and natural.

In addition to guiding the sled by inclining the body while holding the gripping bar 16, the sled may be guided over rough uneven surfaces, such as ice sloping transversely to the direction of travel and other irregularities, by a brake device operable by a handle 17 positioned immediately in front of the seat 13 where it can be easily grasped by the rider. The handle 17 is fastened to the baseboard 10 by a pair of angle members 18 positioned one on each side of the longitudinal center line of the base board and with which the handle is connected by a transversely extending pivot 19. The angle members 18 are so positioned that the handle 17 is straddled by the rider with the upper end of the handle within easy grasping distance. The handle assists the rider in maintaining his balance and also assists in steering when the rider leans to one side or the other to tilt the sled.

A generally U-shaped member 20 provides a brake operable by tilting the handle 17 rearwardly from its normal approximately vertical position. The stems 21 of the U-shaped member 20 extend forwardly on either side of the members 18 and are fastened to the baseboard 10 by screws, bolts or nuts 22. The stems 21 are inclined away from the baseboard 10 so that the transverse portion of the member 20 is normally elevated at some distance above the baseboard 10. A bar 23 projects rearwardly from and is fastened to the handle 17 by screws or bolts 24. The transverse portion of the member 20, when in its normal elevated position as shown in Fig. 1, provides a support with which the bar 23 normally contacts and permits the handle 17 to stand in approximately vertical position but slightly inclined to the rear. The handle 17 is freely tiltable forwardly to a position wherein it is approximately parallel to the baseboard 10. In case the rider is thrown forward as sometimes happens by sudden stopping of the sled, the handle will tilt forwardly out of the way of and avoid injury to the rider by contact therewith and also avoids injury to the handle.

The member 20 has a pair of oppositely positioned projections 25 turned down with the lower edges providing a plurality of serrations 26. The baseboard 10 has a recess 27 on each side and immediately underneath the projections 25. Tilting of the handle 17 rearwardly from its normal position causes the bar 23 to lower the member 20 and thus to move the projections 25 through the recesses 27 to a position wherein the serrations 26 engage and score the ice, snow or other material over which the sled is moving and thereby produces a braking effect.

It frequently happens, due to irregularities in the surfaces of the ice or snow, that one projection 25 engages the ice or snow before the other and this tends to turn the sled out of its course, particularly when the velocity is high. This tendency to turn is eliminated by having the member 20 sufficiently resilient that it easily bends laterally whereby both members 25 are caused to engage the ice or other supporting material substantially simultaneously regardless of irregularities in the surface of the supporting material. The simultaneous equalized engagement of the members 26 with the supporting surface maintains equal braking effect on opposite sides of the sled and holds it to a straight course. Upon release of pull on the handle 17, the member 20 returns to the position shown in Figs. 1 and 3.

The resistance of the member 20 to bending as well as its tendency to distortion to produce even braking action, is supplemented and modified by a resilient member 28 positioned between the base 10 and the member 20 and fastened to the latter by a rivet 29.

The base 10 may be made of any suitable material such as hard wood and is preferably initially smoothed and provided with a coating of paraffin or similar material so that it easily rides over bumps and other barriers in descending a slope. The abrasive contact of the base 10 with ice and snow tends to keep the surface smooth and enables the sled to attain a high velocity on ordinary slopes.

Thus it will be seen that I have provided an improvement in sleds of the kind described and in steering and braking means therefor which, in combination with the sled improvements, adapts the latter to travel at high velocities over artificial or natural barriers and provides the rider with means to maintain his balance and to guide the sled and prevent its overturning. In other words, the sled may be in control at all times while coasting.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a sled of the kind described, a baseboard or runner, a vertically extending handle, a pivot about which the handle is oscillatable longitudinally of the board, a resilient member having one edge fastened to and its opposite edge elevated above said board, a downwardly projecting scoring member mounted on said elevated edge of the resilient member, and means operatively connecting said handle with the resilient member whereby tilting movement of the handle in one direction actuates said scoring member to a position wherein its lower end projects below said board.

2. In a sled of the kind described, a board or runner, a seat member mounted on said board, a vertically extending handle positioned between the seat member and front end of the board, a pivot about which the handle is oscillatable, a resilient member having one edge fixedly fastened to the sled and its other edge spaced from and yieldably movable relative to said board, a plurality of ice or snow scoring members projecting downwardly from said resilient member, and means operatively connecting said handle with said resilient member whereby tilting movement of the handle in one direction actuates said scoring members to a position wherein their lower ends project below said board.

3. In a sled of the kind described, a board or runner, a vertically extending handle, a pivot about which the handle is oscillatable, a resilient member fixedly mounted on the sled and having a portion thereof spaced from and yieldably movable toward said board, a plurality of downwardly projecting scoring members mounted on the resilient member, and means operatively connecting said handle with said resilient member whereby tilting movement of the handle in one direction actuates said scoring members to a position wherein their lower ends project below said board.

4. In a sled of the kind described, a board or runner, a vertically extending handle, a pivot about which the handle is oscillatable longitudinally of the board, a resilient plate member extending across the top of and having one transverse edge fastened to said board and the opposite transverse edge elevated above the board, a pair of downwardly projecting members mounted on the plate member and respectively positioned adjacent the opposite lateral edges of the board, means connecting the handle with the central portion of the elevated edge of the plate member and operable by tilting movement of the handle in one direction to actuate said plate member to move said downwardly projecting members below said board and into contact with the ice or other material supporting the sled, said plate member being adapted to bend to permit unequal movement of the projecting members for contact with material having an uneven surface.

5. A sled comprising a baseboard having its front end curved upwardly, a vertically extending handle positioned rearwardly of the curved end of the board, a pivot about which the handle is oscillatable, a resilient plate member extending across the top of and having one transverse edge fastened to said board and the opposite transverse edge elevated above the board, downwardly projecting ice or snow scoring members mounted on the ends of the elevated edge of the plate member, means operatively connecting the handle with the plate member whereby tilting movement of the handle in one direction to actuate said plate member to move said downwardly projecting members to a position wherein their lower ends project below said board.

6. A sled comprising a board or runner having its front end curved upwardly, a seat member mounted on said board, a transverse bar fastened to and projecting laterally from the curved end of the board to provide a foot rest, a vertically extending handle positioned between the seat member and foot rest, a pivot about which the handle is oscillatable, a resilient plate member extending across the top of and having one transverse edge fastened to said board and the opposite transverse edge elevated above the board, downwardly projecting members mounted on the edge of the plate member, means connecting the handle with the elevated edge of the plate member and operable by tilting movement of the handle in one direction to actuate said plate member to move said downwardly projecting members to a position wherein their lower ends project below said board.

7. A sled comprising a board or runner having its front end curved upwardly, a seat member rigidly mounted on said board, a vertically extending handle positioned forwardly of the seat member, a pivot about which the handle is oscillatable longitudinally of the board, a resilient plate member extending across the top of and having one transverse edge fastened to said board and the opposite transverse edge elevated above the board, a pair of downwardly projecting members mounted on the plate member and respectively positioned adjacent the opposite lateral edges of the board, means connecting the handle with the central portion of the elevated edge of the plate member and operable by tilting movement of the handle in one direction to actuate said plate member to move said downwardly projecting members below said board and into contact with the ice or other material supporting the sled, said plate member being adapted to bend to permit unequal movement of the projecting members for contact with material having an uneven surface.

8. A sled comprising a baseboard having its front end curved upwardly, a vertically extending handle positioned rearwardly of the curved end of the board, a pivot about which the handle is oscillatable longitudinally of the board, a resilient plate member extending across the top of and having one transverse edge fastened to said board and the opposite transverse edge elevated above the board, a pair of downwardly projecting members mounted on the plate member adjacent the opposite lateral edges of the board, said projecting members each having a plurality of serrations on their lower ends, means connecting the handle with the central portion of the elevated edge of the plate member and operable by tilting the handle in one direction to actuate said plate member to move said downwardly projecting members below said board, the resilience of the plate member adapting it to bend to permit unequal movement of the projecting members for simultaneous engagement with sled supporting material having an uneven surface.

9. A sled comprising a board having its front end curved upwardly, a seat member rigidly connected with said board, a transverse bar rigidly fastened to and projecting laterally from the board to provide a foot rest, a vertically extending handle positioned between the seat member and foot rest, a pivot about which the handle is oscillatable longitudinally of the board, a resilient plate member extending across the top of and having one transverse edge fastened to said board and the opposite transverse edge elevated above the board, a pair of downwardly projecting members respectively mounted on the plate member adjacent the lateral edges of the board and each having a plurality of serrations on its lower end, said board having recesses in its longitudinal edges respectively underlying said serrated projecting members, a bar projecting from said handle and resting upon said elevated edge of the plate member whereby tilting movement of the handle in one direction actuates said plate member to move said downwardly projecting members through said recesses, the resilience of the plate member adapting it to bend to permit unequal movement of the downwardly projecting members for simultaneous engagement with sled supporting material having an uneven surface.

JOSEPH M. SIMMONS.